Dec. 20, 1966 J. L. KOCH 3,292,836

TAPE ADVANCING APPARATUS

Filed Oct. 19, 1964 3 Sheets-Sheet 1

INVENTOR
J. L. KOCH
BY Leo Stanger
ATTORNEY

TAPE ADVANCING APPARATUS

Filed Oct. 19, 1964 3 Sheets-Sheet 2

Dec. 20, 1966 J. L. KOCH 3,292,836

TAPE ADVANCING APPARATUS

Filed Oct. 19, 1964 3 Sheets-Sheet 3

United States Patent Office 3,292,836

Patented Dec. 20, 1966

3,292,836

TAPE ADVANCING APPARATUS

Jules L. Koch, New York, N.Y., assignor to Bell Telephone Laboratories, Incorporated, New York, N.Y., a corporation of New York Filed Oct. 19, 1964, Ser. No. 404,744
11 Claims. (Cl. 226—190)

This invention relates to tape feeding devices, particularly, although not exclusively, for feeding comparatively weak tapes, such as paper tapes, against intermittent retarding forces. It is a principal object of the invention to feed such tape in one direction and yet permit the tape to be retarded, or retrieved in the other direction, without tearing the tape.

One machine requiring such tape feed is a teletypewriter monitor on a service board in a teletypewriter service office. Here, a number of service operators each manning one of an array of service boards, diagnose troubles in remote teletypewriters by telephonically asking the remote operator to send a coded message. When the remote operator complies, the ability of the remote station to make the monitor type the coded message on the tape indicates the condition of the remote teletypewriter. The tape feeds out of the monitor. It is read by the service operator and, after short storage, ultimately discarded. The amount of such tape discarded is prodigious.

In the past teletypewriter monitors mounted at desk level generally possessed a chute, whose entrance was spaced from the tape feed-out mechanism to furnish a reading span, and whose main passage led to a waste bin beneath the monitor. An operator, after reading the printed paper tape discharged by the monitor, was to slip the tape into that chute. The weight of the paper tape in and below the chute gravitationally was to draw any newly dispensed tape through the chute, into the bin. The waste bin, in addition to representing a disposal area, constituted a storage area. Thus, an operator could retrieve previously discarded tape by pulling it back through the chute.

Unfortunately, these tape disposal chutes often went unused because the teletypewriter monitor's typing upon the tape produced a static electric charge which caused the tape to cling to the chute. This clinging considerably increased the existing mechanical resistance to passage of tape through the chute and eventually clogged it. Also, as the tape bin or waste bin filled up, the weight of running tape available to draw the downwardly decreased enough to stop tape movement.

The deficiencies of these chute-type disposal devices were aggravated by a reduction in available space for chutes, when faster but larger monitors were installed on existing service boards. The added disadvantage was enough to eliminate chute-type disposal devices altogether. On present machines large amounts of tapes simply accumulate on the floor.

An object of this invention is to overcome the deficiencies of prior tape disposal means so they can be used with the new large monitors. More generally, it is an object of the invention to improve tape feeding mechanisms.

Another object of the invention is to feed weak tape in one direction with enough force to overcome the accumulated resistances of even a small narrow chute on charged tape, and yet permit the tape to be stopped or retrieved against the feeding force.

It is another object to make tape feeding mechanisms more effectively bias the tape or unidirectional movement but nevertheless permit bidirectional movement.

Another object of the invention is to feed tape in such a manner as to overcome the mechanical resistance to passage of the tape through a chute, including that resistance resulting from static electricity produced on the tape by the teletype monitor.

Another object of the invention is to eliminate feed rate variations due to decreases in the available weight of running tape as a tape bin fills.

Another object of the invention is to feed comparatively weak tape without tearing it even if the teletype machine varies its speed or stops.

Yet another object of the invention is to permit retrieval of the tape from the used tape bin despite continuous feeding operation of the tape.

According to the invention these objects are achieved in whole or in part by exposing, with an elongated opening, a portion of the interior on the chute that guides the tape from the teletypewriter monitor to a bin, and then moving one or more frictionally-surfaced, resilient blades into the opening and wiping the tape therein forward. More particularly, this is accomplished with an elongated opening on one side of the chute, by securing a plurality of blades in windmill fashion on a rotating motor shaft and mounting the shaft close enough to the opening that the moving blades successively enter the opening and bend as they do, to press the tape against the wall of the chute opposite the opening and wipe the tape forward with their frictional surfaces during their progress. Preferably, the path over which the blades wipe in their stressed condition terminates beyond one end of the opening. This prevents the blades from pulling the tape out of the chute through the opening as they snap to an unstressed shape.

These and other features, both broader and more specific, are pointed out in the claims forming a part of this specification. Other objects and advantages of the invention will become obvious from the following detailed description when read in light of the accompanying drawing, wherein:

Figure 1:
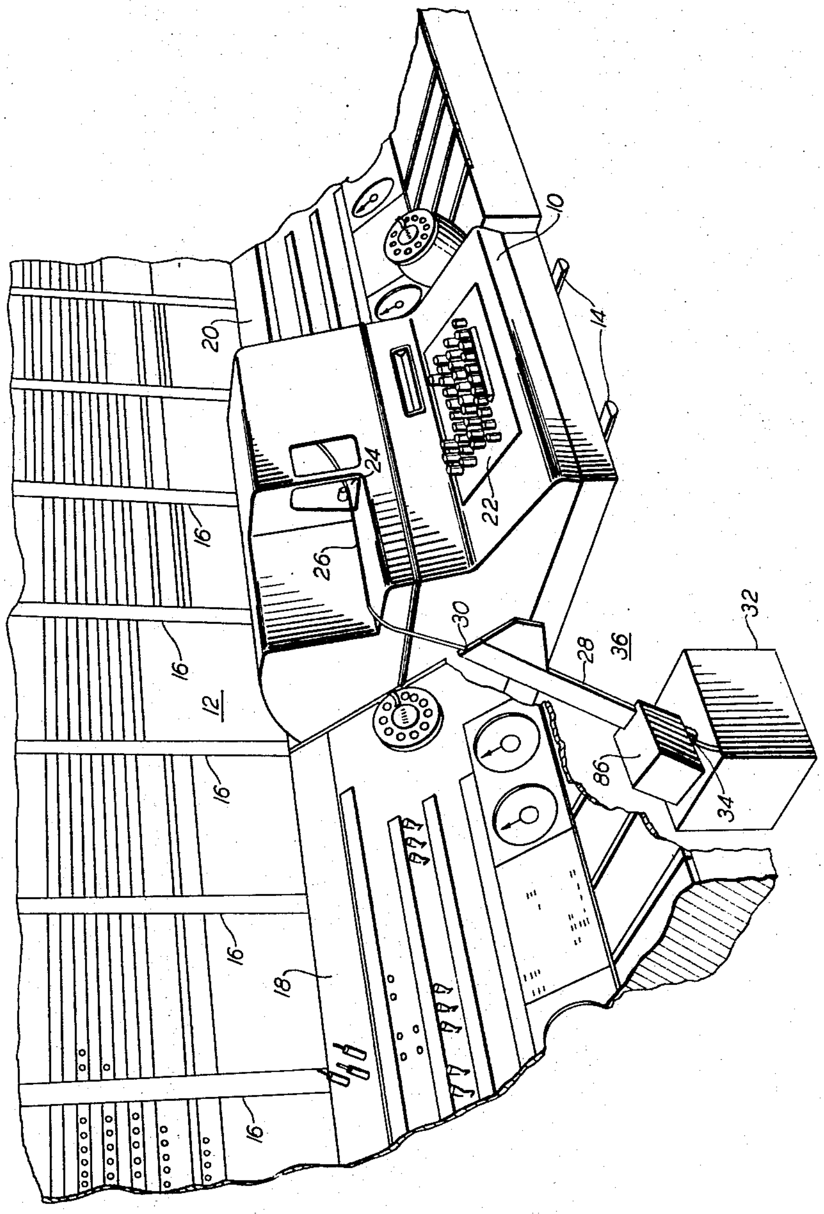
FIG. 1 is a partially broken away perspective view of a teletypewriter machine embodying features of the invention.

In FIG. 1, a teletypewriter monitor 10 forms part of a telegraph services board 12. An array of similar adjacent aligned boards make up a central service office where service operators contact remote teletypewriter operators within a given area. If trouble develops with a remote teletypewriter, the monitor service operator, after discussing the matter telephonically with the remote operator, can receive coded messages from the defective remote teletypewriter, and on the basis of fidelity with which these messages are received, prescribe corrective action. The monitor 10 sits upon a desk-level support 14 below a panel board holding an array of jack panels 16 and between two service board key shelves 18 and 20. The shelf 18 and five jack panels 16 belong to the service board 12 of the monitor 10. The key shelves 20 and the jack panels 16 in its vicinity belong to an adjacent service board 12.

The monitor 10 includes a hand operated keyboard 22 and a centrally located tape feedout 24 that intermittently feeds a ribbon of typed tape 26 from right to left. Before passing the tape 26 to the feedout 24, the monitor 10 types messages received from the remote teletypewriter onto the tape 26. The feedout rate varies with the typing much as a typewriter platen. The typed messages are usually of a transitory significance. They give the service board operator an indication of the nature of the mistakes of the remote teletypewriter when he compares them with messages he receives by telephone. Most tape, therefore, constitutes waste paper almost immediately after use. However, it must remain to some extent retrievable so that the operator can check previous messages against a message received at any time. Since little extra space is available in an office of this type, the tape must be disposed of neatly and quickly. A narrow tape guiding chute 28 fitted between the monitor 10 and the key shelf 18 presents a tape receiving orifice 30 and guides the tape into a tape bin 32 located below the support 14. The chute discharges the tape 26 at a tape discharge orifice 34.

Figure 2:
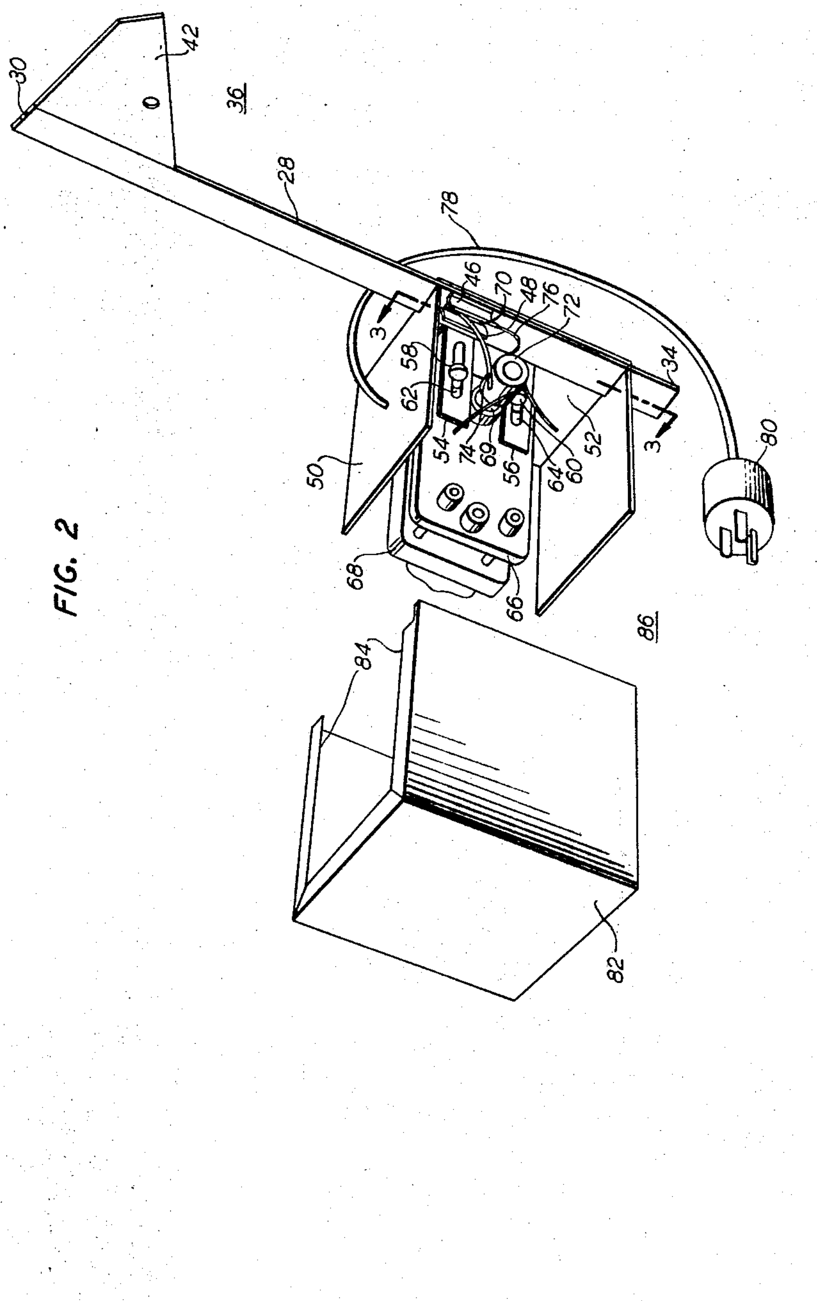
FIG. 2 is a partially exploded perspective view of the feeding device in FIG. 1 and embodying features of the invention.
Figure 3:
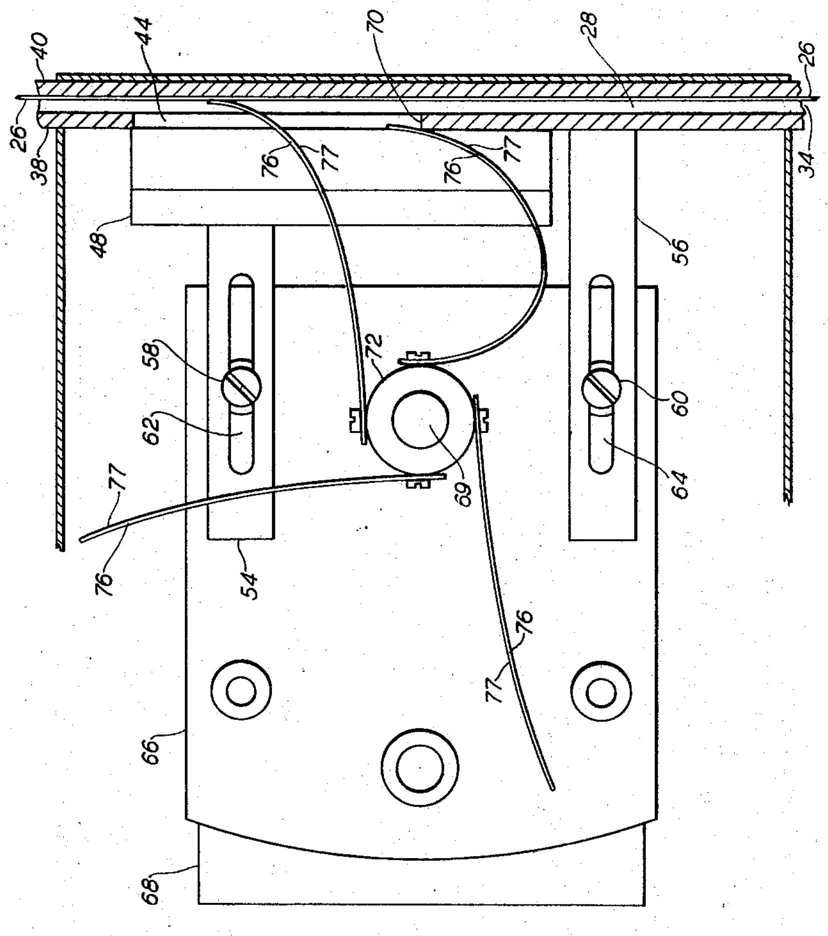
FIG. 3 is a section 3—3 of FIG. 2.

The chute 28 forms part of a tape feeding device generally designated 36 and illustrated in more detail in FIGS. 2 and 3. The chute member 28 has a narrow rectangular cross section and is composed of four walls, two wide and two narrow, all having smooth interior surfaces. The two wide walls are designated in FIG. 3 as 38 and 40. A solid quadrilateral mounting section 42, shown in FIG. 2, is integral with the chute 28 and permits securing the chute between the monitor 10 and key shelf 18 by means of a screw. Located below the desk level of FIG. 1 is an elongated opening 44 in the forward wall 38 of the chute 28.

Two parallel upstanding and then diverging guide members 46 and 48 are secured to the chute at the longitudinal edges of the opening 44. The chute 28 supports, by means of welding or other suitable fastening means, the center wall 52 of three integral walls of a box covering 50. The center wall 52 forms a base that supports two outwardly extending slotted brackets 54 and 56. A pair of screws 58 and 60 secured at adjustable locations along the slots 62 and 64 of brackets 54 and 56 support a gear box 66 that steps down the rotary motion from the shaft of an electric motor 68. Suitable means secure the motor 68 to the gear box 66. The output of the gear box 66 constitutes a rotatable shaft 69 which is located directly above the lower edge 70 of the opening 44 in FIG. 3. A sleeve 72, secured over the end of the shaft 69, supports four screws 74 that respectively hold, in paddle wheel fashion, the ends of four resilient and elongated blades 76 whose width is tapered. These blades 76 are made of red neoprene with woven cotton fabric support. They have their leading surfaces 77 rubberized or faced with black neoprene. In one embodiment of the invention they are .062 inch thick, 2.125 inches long, and taper in width from .250 inch at the sleeve 72 to .170 inch. In use these blades are intermittently bent in one direction. Although they spring back substantially to an unstressed shape after they are released, they may retain a slight arcuate shape.

The screws 58 locate the gear box 66 along the slots 62 and 64 to place the shaft 69 at a distance from the wall 40 substantially less than the length of the blades 76. Thus, when the motor 68 is energized electrically through plug 80 and a cord 78 to drive the shaft 69 in a clockwise direction in FIG. 3, the blades 76 bend as shown due to contact with the chute 28. The axial location of the sleeve 72 on the shaft 69 is such as to make the blades 76 enter the opening 44 and wipe against the opposite wall 40 until they knock against the edge 70 of the opening 44. They continue to wipe the outer surface of the wall 38 after which they return to their unstressed shape.

The tape 26 coming into contact with one of the blades 76 is squeezed between the black neoprene frictional surface 77 and the wall 40 and thereby wiped longitudinally along the chute 28. During rotation of the shaft 69 the blades 76 successively wipe the tape 26 forward in the chute 28 and out of the orifice 34. The length of each wiping stroke of the blades 76 can be adjusted partly by moving the gear box 66 along the slots 62 and 64 of the brackets 54 and 56. The guides 46 and 48, flaring out as they do, assure that the resilient blades 76 always enter the opening 44 rather than rest on the longitudinal edges of the opening. A suitable chute 28 has sufficient thickness and just sufficient width to clear the tape 26, and a suitable opening 44 is wide enough to receive the blades 76 but less than the width of the tape. Were the opening 44 wider the blades 76 would have a tendency to pull the tape 26 out of the opening. A suitable width for the portions of the blades 76 entering opening 44 is half the tape width.

In operation, the cord 78 is plugged into the alternating current power of the teletypewriter monitor 10 and therefore stops and starts the motor 68 when the main power to the monitor 10 is turned on and off. This moves the blades 76 in windmill fashion as long as the monitor 10 is energized. The tape 26 emitted intermittently by the feedout 24 is placed by an operator into the orifice 30. Consequent feedout and any necessary help from the operator then moves the tape 26 against the interference of the top of the chute, toward the opening 44.

Upon passing by the opening 44 the circularly moving blades 76 begin to wipe the tape forward and hence positively feed it out of the orifice 34 into the tape bin 32. Since this inner surface of chute 28 is smooth compared to the black neoprene frictional surfaces 77 of the blades 76, very little resistance is encountered to the forward motion imposed by the blades. These blades are sufficiently resilient to bend as they move and press the tape 26 against the wall 40.

During standby when the monitor 10 is still energized but the feedout 24 has stopped the tape 26, the blades 76 can keep wiping the tape downwardly. However, the force necessary to bend the resilient blades 76 is small enough so that continuous wiping of their frictional surfaces 77 against the paper is not sufficient to move the paper or tear it against the retarding force of the feedout device 24 now at standstill. In fact, to retrieve the tape 26 an operator can simply pull it out of the orifice 30 against the wiping action of the blades without harming the tape.

Variation of the blades' pull is possible by adjusting the position of the gear box along the slots 52 and 64 with the screws 58 and 60. Compensation for wear of the blades 76 may similarly be made by adjusting the position of the gear box 66 along the slots 52 and 64.

The position of the shaft 69 opposite the edge 70 in the opening 44 is advantageous in that each blade 76 discontinues its paper advancing action before it resiliently returns to its unstressed condition. In other words, each is still stressed and has not begun to unbend. Were the edge 70 placed farther to the left in FIG. 3, the unbending action, particularly the very end of the unbending action of each blade, may possibly draw the tape 26 out of the opening 44. Moreover, while each blade still presses against the paper 26 and moves to the left in FIG. 3, the black neoprene surface 77 of the blade 76 abuts against the edge 70. As the blade 76 continues to move and press the edge 70 lightly lifts the end of the blade 76 off the paper 26 and eases the pressure gradually.

A cover member 82 having three walls and flanges 84 on each wall embraces the box 50 to protect completely the wiping mechanism. The total box, designated 86, fits under the support 14 and requires substantially no alteration of existing equipment.

With this feedout device the operation of teletypewriter monitors or other machines having similar tape feeding requirements is not only improved operationally but made neater. The rotating blades 76 overcome the resistive force of the tape chute 28, combined with the electrostatic effect of typing on the tape, and apply a reliable downward feed. Nevertheless, they permit safe retardation or retrieval of the tape without tearing. Since tape feed, if it depends upon gravity at all, does so only at an initial starting point and not after the tape has passed through the lower orifice 34, the available weight of running tape fails to affect the feed. The tape bin 32 can be completely filled and still have virtually no effect on the operation of the advancing mechanism.

While an embodiment of the invention has been described in detail, it will be obvious to those skilled in the art that the invention may be embodied otherwise without departing from its spirit and scope.

What is claimed is:

1. An apparatus for advancing tape, comprising enclosed chute means defining a travel path for the tape between two points, said chute means having an elongated opening between the points, said opening exposing a portion of the travel path between the points, elongated bendable blade means having a frictional surface and an end portion, and rotating driver means mounted near said opening and moving said blade means circularly for periodically pressing the end portion of said blade means against said chute and moving the end portion along a predetermined length, said driver means being located so that the end portion enters the opening and thereafter presses against the unexposed part of said chute means.

2. An apparatus for advancing tape, comprising enclosed chute means defining a travel path for the tape between two points, said chute means having an elongated opening between the points, said opening exposing a portion of the travel path between the points, elongated bendable blade means having a frictional surface and an end portion, and rotating driver means located near said chute means and moving said blade means about a circle intersecting said chute means for periodically pressing an end portion of said blade means against said chute means and moving the end portion over a given length, said driver means being located so that said end portion first enters the opening and thereafter presses against the unexposed portion of said chute means.

3. An apparatus for advancing tape, comprising enclosed chute means defining a travel path for the tape between two points, said chute means having an elongated opening between the points, said opening exposing a portion of the travel path between the points, elongated bendable blade means having a frictional surface and an end portion, and rotating driver means located near said chute means and moving said blade means about a circle intersecting said chute means for periodically pressing an end portion of said blade means against said chute means and moving the end portion along a given length, said driver means and blade means being located so that the end portion of said blade means is within said opening only during the first half of the length over which the end portion wipes against said chute means.

4. An apparatus for advancing tape, comprising enclosed chute means defining a travel path for the tape between input and output points, said chute means having an elongated opening between the points, said opening exposing a portion of the travel path between the points, elongated bendable blade means having a frictional surface and an end portion, and rotating driver means mounted near said chute means and moving said blade means in a circle that intersects said chute means, the center of said circle being located opposite the end of said opening closer to the output point.

5. An apparatus for advancing tape, comprising enclosed chute means defining an enclosed tape guiding passage, said chute means having an elongataed opening in said apssage between the ends thereof to expose a portion of the passage and to expose tape when tape is passing through the chute, rotating driver means having a drive shaft spaced from said chute means near the opening and extending transverse to the chute, and a plurality of radially extending bendable blades mounted on said shaft and longer than the space between said shaft and said chute means, said blades fitting into said opening for wiping the interior of said chute means, said opening extending from a point on said chute means closest to said shaft in the direction from which said tape is to be fed.

6. An apparatus for advancing tape, comprising enclosed chute means defining an enclosed tape guiding passage, said chute means having an elongated opening in said passage between the ends thereof to expose a portion of the passage and to expose tape when tape is passing through the chute, rotating driver means having a drive shaft spaced from said chute means near the opening and extending transverse to the chute, a plurality of radially extending bendable blades mounted on said shaft and longer than the space between said shaft and said chute means, said blades fitting into said opening for wiping the interior of said chute means, and means extending from said chute means toward said blades for guiding said blades toward said opening.

7. An apparatus for advancing tape, comprising enclosed chute means defining an enclosed tape guiding passage, said chute means having an elongated opening in said passage between the ends thereof to expose a portion of the passage and to expose tape when tape is passing through the chute, rotating driver means having a rotatable drive shaft spaced from said chute means neaı the opening and extending transverse to the chute, a plurality of radially extending bendable blades mounted on said shaft and longer than the space between said shafi and said chute means, said blades fitting into said opening for wiping the interior of said chute means when said shaft rotates, said opening defining longitudinal edges, and flange means extending from the edges toward said blades for guiding the blades into the opening during rotation of said shaft.

8. An apparatus for advancing tape, comprising enclosed chute means defining an enclosed tape guiding passage, said chute means having an elongated opening in said passage between the ends thereof to expose a portion of the passage and to expose tape when tape is passing through the chute, rotating driver means having a rotatable drive shaft spaced from said chute means near the opening and extending transverse to the chute, and a plurality of radially extending bendable blades mounted on said shaft and successively extending into said opening during rotation of said shaft to bend against said chute and wipe in the advancing direction of the tape, said opening and said shaft being located relative to each other so that said blades press against said chute after entering and leaving said opening.

9. An apparatus for advancing tape, comprising enclosed chute means defining a travel path for the tape between two points, said chute means having an elongated opening between the points, said opening exposing a portion of the travel path between the points, elongated bendable blade means, rotating driver means holding said blade means and periodically moving said blade means into said opening along the travel path so as to wipe a portion of said blade means along the travel path and thereby advance tape along the travel path, and means in said chute near said opening for guiding said blade means into said opening.

10. An apparatus for advancing tape, comprising enclosed chute means defining an enclosed tape guiding passage, said chute means having an elongaated opening in said passage between the ends thereof to expose a portion of the passage and to expose tape when tape is passing through the chute, rotating driver means having a rotatable drive shaft spaced from said chute means near the opening and extending transverse to the chute, a plurality of radially extending bendable blades mounted on said shaft and longer than the space between said shaft and said chute means, said blades fitting into said opening during rotation of said shaft for wiping the interior of said chute means, said opening defining longitudinal edges, and flange means extending from the edges toward said blades for guiding the blades into the opening, said flange means having two flange members extending from said chute parallel to each other and then flaring away from each other.

11. An apparatus for advancing tape, comprising enclosed chute means defining an enclosed tape guiding passage, said chute means having an elongated opening in said passage between the ends thereof to expose a portion of the passage and to expose tape when tape is passing through the chute, rotating driver means having a rotatable drive shaft spaced from said chute means near the opening and extending transverse to the chute, a plurality of radially extending bendable blades mounted on said shaft and longer than the space between said shaft and said chute means, said blades fitting into said opening for wiping the interior of said chute means during rotation of said drive shaft, said opening defining longitudinal edges, flange means extending from the edges toward said blades for guiding the blades into the opening, said flange means having two flange members extending from said chute parallel to each other and then flaring away from each other, and a casing enclosing said driver means, said shaft, and said blades.

References Cited by the Examiner

UNITED STATES PATENTS

| | | | |
|---|---|---|---|
| 2,353,608 | 7/1944 | Zenner | 178—42 |
| 2,533,317 | 12/1950 | Hanson | 226—152 X |
| 2,569,364 | 9/1951 | Zenner | 226—196 X |
| 2,667,176 | 1/1954 | Wassmer | 226—168 X |
| 2,956,270 | 10/1960 | Wallens et al. | 178—42 X |
| 3,220,605 | 11/1965 | Casey | 221—259 |
| 3,226,110 | 12/1965 | Greene | 271—41 |

References Cited by the Applicant

UNITED STATES PATENTS

| | | |
|---|---|---|
| 203,635 | 5/1878 | McDowell. |
| 2,264,683 | 12/1941 | Smith. |
| 2,360,965 | 10/1944 | Mosher. |
| 2,517,147 | 8/1950 | Vee. |
| 2,912,501 | 11/1959 | Hewitt. |
| 2,969,135 | 1/1961 | Feliu. |

M. HENSON WOOD, Jr., *Primary Examiner.*

ALLEN N. KNOWLES, *Examiner.*